US012625151B2

(12) United States Patent
Kawase et al.

(10) Patent No.: US 12,625,151 B2
(45) Date of Patent: May 12, 2026

(54) INTEGRATED VIEWER FOR MULTIPLE MEASUREMENTS, AND PROGRAM

(71) Applicants: SHIMADZU CORPORATION, Kyoto (JP); SUMITOMO RUBBER INDUSTRIES, LTD., Hyogo (JP)

(72) Inventors: Tomohiro Kawase, Kyoto (JP); Xusheng Zhang, Kyoto (JP); Shiori Nagai, Kyoto (JP); Satoshi Yamamoto, Kyoto (JP); Hiroaki Yamada, Kobe (JP); Wakana Ito, Kobe (JP); Masashi Fukuchi, Kobe (JP); Yuma Unno, Kobe (JP)

(73) Assignees: SHIMADZU CORPORATION, Kyoto (JP); SUMITOMO RUBBER INDUSTRIES, LTD., Hyogo (JP)

( * ) Notice: Subject to any disclaimer, the term of this patent is extended or adjusted under 35 U.S.C. 154(b) by 249 days.

(21) Appl. No.: 17/926,990

(22) PCT Filed: Mar. 26, 2021

(86) PCT No.: PCT/JP2021/012826

§ 371 (c)(1),
(2) Date: Nov. 21, 2022

(87) PCT Pub. No.: WO2021/235090

PCT Pub. Date: Nov. 25, 2021

(65) Prior Publication Data

US 2023/0204607 A1     Jun. 29, 2023

(30) Foreign Application Priority Data

May 22, 2020     (JP) ................................. 2020-089675

(51) Int. Cl.
*G01N 35/00*          (2006.01)
*G01N 30/72*          (2006.01)
(Continued)

(52) U.S. Cl.
CPC ... *G01N 35/00584* (2013.01); *G01N 30/7206* (2013.01); *G01N 30/8631* (2013.01);
(Continued)

(58) Field of Classification Search
CPC ......... G01N 35/00584; G01N 30/7206; G01N 30/8631
(Continued)

(56) References Cited

U.S. PATENT DOCUMENTS

2007/0226634 A1*   9/2007   Hirai ......................... G06F 8/10
                                                              715/744
2012/0010899 A1    1/2012   Minato et al.
(Continued)

FOREIGN PATENT DOCUMENTS

CN          102332051          1/2012
CN          109387648          2/2019
(Continued)

OTHER PUBLICATIONS

"International Search Report (Form PCT/ISA/210) of PCT/JP2021/012826," mailed on Jun. 1, 2021, with English translation thereof, pp. 1-6.
(Continued)

*Primary Examiner* — Peter J Macchiarolo
*Assistant Examiner* — Rodney T Frank
(74) *Attorney, Agent, or Firm* — JCIPRNET

(57) ABSTRACT

An integrated viewer for multiple measurements according to a first aspect includes: a storage unit that stores, for each of a plurality of types of analyzers, a type of a feature amount obtained from a measurement result of the analyzer; a display control unit that displays types of feature amounts stored in the storage unit on a display screen in a selectable manner; and a registration unit that names and registers a set of types of feature amounts selected by an operator among
(Continued)

the types of the feature amounts. The display control unit displays, side by side on the display screen, a first display region in which the type of the feature amount is displayed in a tab for each type of the analyzers and a second display region in which the set of types of the feature amounts selected by the operator is displayed.

10 Claims, 11 Drawing Sheets

(51) Int. Cl.
    *G01N 30/86*     (2006.01)
    *G01N 30/02*     (2006.01)

(52) U.S. Cl.
    CPC . *G01N 2030/025* (2013.01); *G01N 2030/027* (2013.01); *G01N 2035/00306* (2013.01); *G01N 2035/00851* (2013.01); *G01N 2035/0091* (2013.01)

(58) Field of Classification Search
    USPC ....................................................... 73/863.01
    See application file for complete search history.

(56) References Cited

U.S. PATENT DOCUMENTS

2016/0180555 A1 * 6/2016 Matsuo ................. G06F 3/0482
                    345/440

2017/0307551 A1   10/2017  Murakami
2020/0110063 A1    4/2020  Fukushima et al.

FOREIGN PATENT DOCUMENTS

| | | |
|---|---|---|
| CN | 110988375 | 4/2020 |
| JP | 86480860 | 3/1989 |
| JP | H03105248 | 5/1991 |
| JP | 2001221788 | 8/2001 |
| JP | 2007232480 | 9/2007 |
| JP | 2012021815 | 2/2012 |
| JP | 2017194360 | 10/2017 |

OTHER PUBLICATIONS

"Written Opinion of the International Searching Authority (Form PCT/ISA/237)" of PCT/JP2021/012826, mailed on Jun. 1, 2021, with English translation thereof, pp. 1-7.

Office Action of Japan Counterpart Application, with English translation thereof, issued on May 9, 2023, pp. 1-8.

"Office Action of China Counterpart Application", issued on Sep. 11, 2024, with English translation thereof, pp. 1-17.

* cited by examiner

START

DISPLAY TEMPLATE CREATION SCREEN ⟋S10

CREATE TAB ⟋S11

SELECT TAB ⟋S12

DISPLAY TYPES OF FEATURE AMOUNTS THAT CAN BE ACQUIRED ⟋S13

SELECT TYPES OF FEATURE AMOUNTS ⟋S14

DISPLAY LIST OF TYPES OF FEATURE AMOUNTS ⟋S15

SET DISPLAY/NON-DISPLAY ⟋S16

REGISTER TEMPLATE ⟋S17

END

INTEGRATED VIEWER FOR MULTIPLE MEASUREMENTS, AND PROGRAM

CROSS-REFERENCE TO RELATED APPLICATION

This application is a 371 of international application of PCT application serial no. PCT/JP2021/012826, filed on Mar. 26, 2021, which claims the priority benefit of Japan application no. 2020-089675, filed on May 22, 2020. The entirety of each of the above mentioned patent applications is hereby incorporated by reference herein and made a part of this specification.

TECHNICAL FIELD

The present invention relates to an integrated viewer for multiple measurements and a program.

BACKGROUND ART

An analysis system (hereinafter also referred to as "multiple analyzers cross-sectional analysis system") for analyzing a plurality of measurement results acquired by a plurality of types of analyzers in a cross-sectional manner has been proposed. As an analysis system of this kind, for example, Japanese Patent Laying-Open No. 2017-194360 (PTL 1) discloses a sample analysis system that acquires measurement data of a target sample using a plurality of types of analyzers including at least one of an X-ray fluorescence analyzer, an atomic absorption photometer, and an inductively coupled plasma emission analyzer and at least one of an infrared spectrophotometer and a Raman spectrophotometer, and identifies the target sample on the basis of the acquired measurement data. In PTL 1, the measurement data acquired by a device suitable for analyzing inorganic substances and measurement data acquired by a device suitable for analyzing organic substances are used concurrently to improve the identification accuracy of the target sample.

CITATION LIST

Patent Literature

[Patent Literature (PTL) 1] Japanese Patent Laying-Open No. 2017-194360

SUMMARY OF INVENTION

Technical Problem

An integrated viewer for multiple measurements used for the above analysis system is required to select and display a feature amount that meets the purpose and application of a specific analysis from among a plurality of feature amounts acquired from each of a plurality of measurement results and to enable analysis such as machine learning using the selected feature amount.

On the other hand, since there are a wide variety of combinations of feature amounts, the operation of selecting a feature amount that meets a specific analysis purpose or application becomes complicated, which may raise concern over deterioration in convenience of a user performing the analysis operation.

The present invention has been made to solve the above-described problems, and an object of the present invention is to provide a user interface that facilitates a cross-sectional analysis of measurement results by a plurality of types of analyzers.

Solution to Problem

An integrated viewer for multiple measurements according to a first aspect of the present invention includes: a storage unit that stores, for each of a plurality of types of analyzers, a type of a feature amount obtained from a measurement result of the analyzer; a display control unit that displays types of feature amounts stored in the storage unit on a display screen in a selectable manner; and a registration unit that names and registers a set of types of feature amounts selected by an operator among the types of the feature amounts. The display control unit displays, side by side on the display screen, a first display region in which the type of the feature amount is displayed in a tab for each type of the analyzers and a second display region in which the set of types of the feature amounts selected by the operator is displayed

Advantageous Effects of Invention

According to the present invention, a user interface that facilitates a cross-sectional analysis of measurement results by a plurality of types of analyzers can be provided.

DESCRIPTION OF EMBODIMENTS

Figure 1:
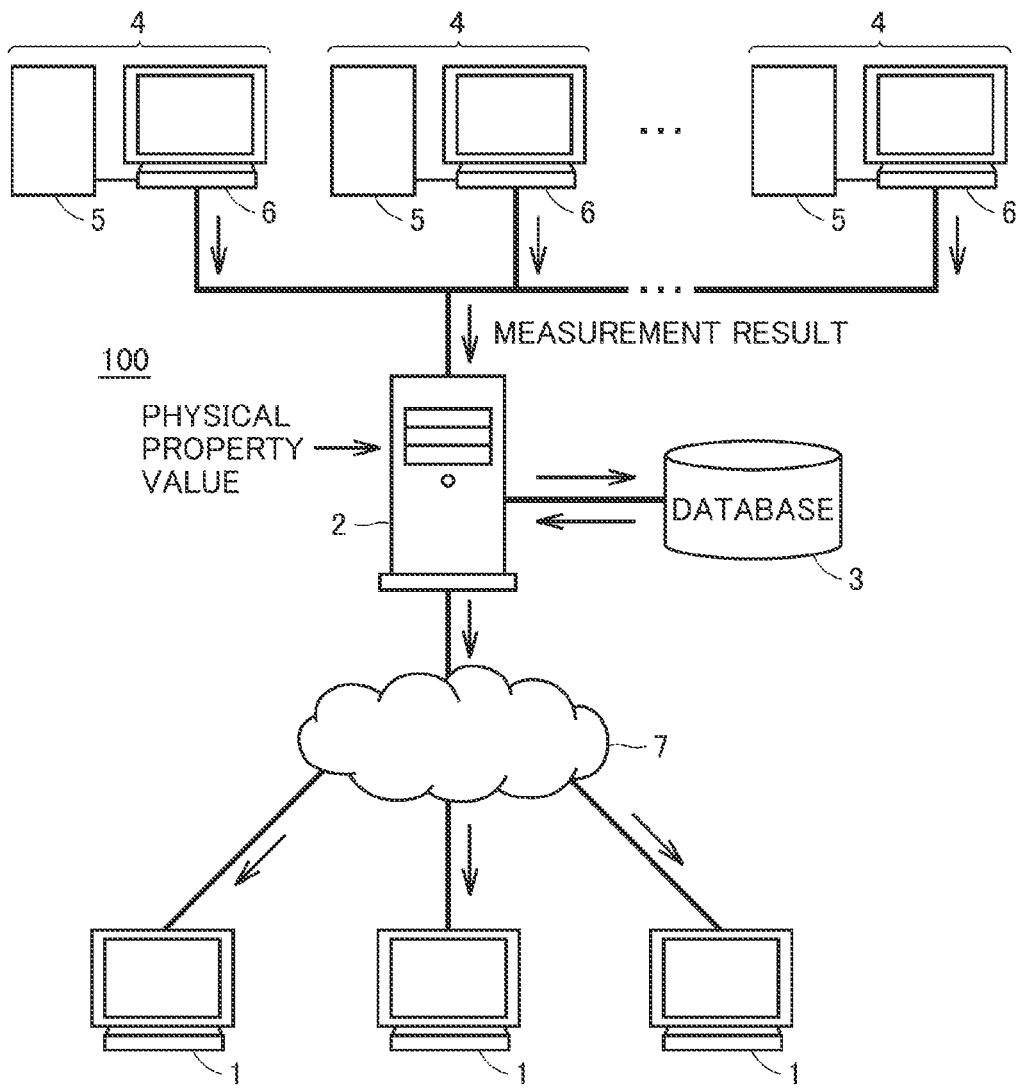
FIG. 1 is a schematic diagram for describing a configuration example of a multiple analyzers cross-sectional analysis system to which an integrated viewer for multiple measurements according to an embodiment is applied.

An embodiment of the present invention will be described in detail below with reference to the drawings. In the following, the same or corresponding parts in the drawings are denoted by the same reference signs, and the description thereof will not be basically repeated.

[Overall Configuration of Multiple Analyzers Cross-Sectional Analysis System]

FIG. 1 is a schematic diagram for describing a configuration example of a multiple analyzers cross-sectional analysis system to which an integrated viewer for multiple measurements according to the present embodiment is applied. The multiple analyzers cross-sectional analysis system (hereinafter, also simply referred to as "analysis system") indicates a system for analyzing a plurality of measurement results acquired by a plurality of types of analyzers in a cross-sectional manner. The integrated viewer for multiple measurements (hereinafter, also simply referred to as "viewer") according to the present embodiment is configured to display a measurement result selected by an operator among a plurality of measurement results and a feature amount obtained from the measurement result.

Referring to FIG. 1, an analysis system 100 includes a plurality of types of analyzers 4, a server 2, a database 3, and at least one viewer 1.

The plurality of types of analyzers 4 measure a sample. The plurality of types of analyzers 4 include, for example, a liquid chromatograph (LC), a gas chromatograph (GC), a liquid chromatograph mass spectrometer (LC-MS), a gas chromatograph mass spectrometer (GC-MS), a scanning electron microscope (SEM), a transmission electron microscope (TEM), an energy dispersive X-ray fluorescence analyzer (EDX), a wavelength-dispersive fluorescence X-ray analyzer (WDX), a Fourier transform infrared spectrophotometer (FT-IR), and the like. Analyzers 4 may further include a photodiode array detector (LC-PDA), a liquid chromatography tandem mass analyzer (LC/MS/MS), a gas chromatography tandem mass analyzer (GC/MS/MS), a liquid chromatograph mass spectrometer (LC/MS-IT-TOF), a near-infrared spectrometer, a tensile tester, a compressive tester, and the like. Analysis system 100 includes a plurality of types of analyzers 4 that output measurement results different in type from each other, thereby being capable of providing a broad-ranging analysis of one sample using a plurality of types of measurement results.

Analyzer 4 includes a device body 5 and an information processing device 6. Device body 5 measures a sample to be measured. Identification information of the sample and measurement conditions of the sample are input to information processing device 6.

Information processing device 6 controls the measurement by device body 5 in accordance with the input measurement conditions. Thus, device body 5 acquires measurement data indicating the measurement result of the sample. Information processing device 6 creates a data file including the measurement data acquired by device body 5. Information processing device 6 analyzes the measurement data using dedicated data analysis software to extract a "feature amount" of the sample. This feature amount can be used for machine learning or the like. Note that the feature amount can include, in addition to the feature amount obtained from the measurement data, an arithmetic value obtained by performing arithmetic processing on the feature amount obtained from the measurement data, a measurement condition, a physical property value of the sample, compounding information of a constituent material of the sample, a manufacturing process, and the like.

Information processing device 6 stores the acquired feature amount in a data file together with the measurement conditions and the identification information of the sample, and stores the data file in a built-in memory. Specifically, the information processing device stores, for each sample, a data file in which the measurement conditions, the sample identification information, the measurement data, and the feature amount are aggregated in the memory.

During this process, information processing device 6 can add an "identifier" composed of a character string to a file name of the data file. This identifier is used to identify information that is not directly involved in the measurement by analyzer 4. For example, the identifier may be used to identify a pretreatment condition of the sample. Alternatively, the identifier may be used to identify a date and time at which the sample has been prepared. This makes it possible to identify the measurement data acquired by the same analyzer 4 by the pretreatment condition of the sample or the like.

Information processing device 6 is connected to server 2 in a mutually communicable manner. The connection between information processing device 6 and server 2 may be wired or wireless. For example, the Internet can be used as a communication network connecting information processing device 6 and server 2. Thus, information processing device 6 of each analyzer 4 can transmit the data file to server 2 for each sample.

Server 2 mainly manages the measurement data acquired by the plurality of analyzers 4. The data file for each sample is input to server 2 from each analyzer 4. The "physical property value" of the sample can be further input to server 2 from the outside of server 2. The physical property value of the sample means a value indicating an attribute of the sample acquired by information other than the measurement by analyzer 4.

Although the example of FIG. 1 illustrates the configuration in which the physical property value of the sample is input to server 2, the property value of the sample may be input to analyzer 4. In this case, analyzer 4 transmits, for each sample, the physical property value to server 2 together with the data file. Alternatively, the physical property value of the sample may be input to viewer 1 to be described later.

Database 3 is connected to server 2. Database 3 is a storage unit for storing data to be exchanged between server 2 and the plurality of analyzers 4 and data input from the outside of server 2. Although the example in FIG. 1 illustrates the configuration in which database 3 is achieved by a storage unit externally attached to server 2, database 3 may be incorporated in server 2. Upon receipt of the data file and the physical property value of the sample, server 2 stores, in database 3, the data file and the physical property value in association with each other for each sample.

Server 2 is connected to Internet 7. Further, at least one viewer 1 is connected to Internet 7. Accordingly, viewer 1 can bidirectionally transmit and receive data to and from server 2 via Internet 7. Note that the communication network connecting server 2 and viewer 1 is not limited to Internet 7.

Viewer 1 is configured to be able to display the measurement result and the feature amount of a sample selected by a user (for example, operator) as a display object. Specifically, upon receipt of the selection of the display object by the user, viewer 1 accesses server 2 via Internet 7, thereby acquiring the data file, which is stored in database 3, of the sample selected as the display object. Viewer 1 displays the measurement result and the feature amount stored in the acquired data file on a display screen.

In a case where a plurality of samples are selected as display objects, viewer 1 can display the measurement results and the feature amounts of the plurality of samples on the display screen side by side. Display examples in viewer 1 will be described later.

[Hardware Configuration Example of Analysis System]

Figure 2:
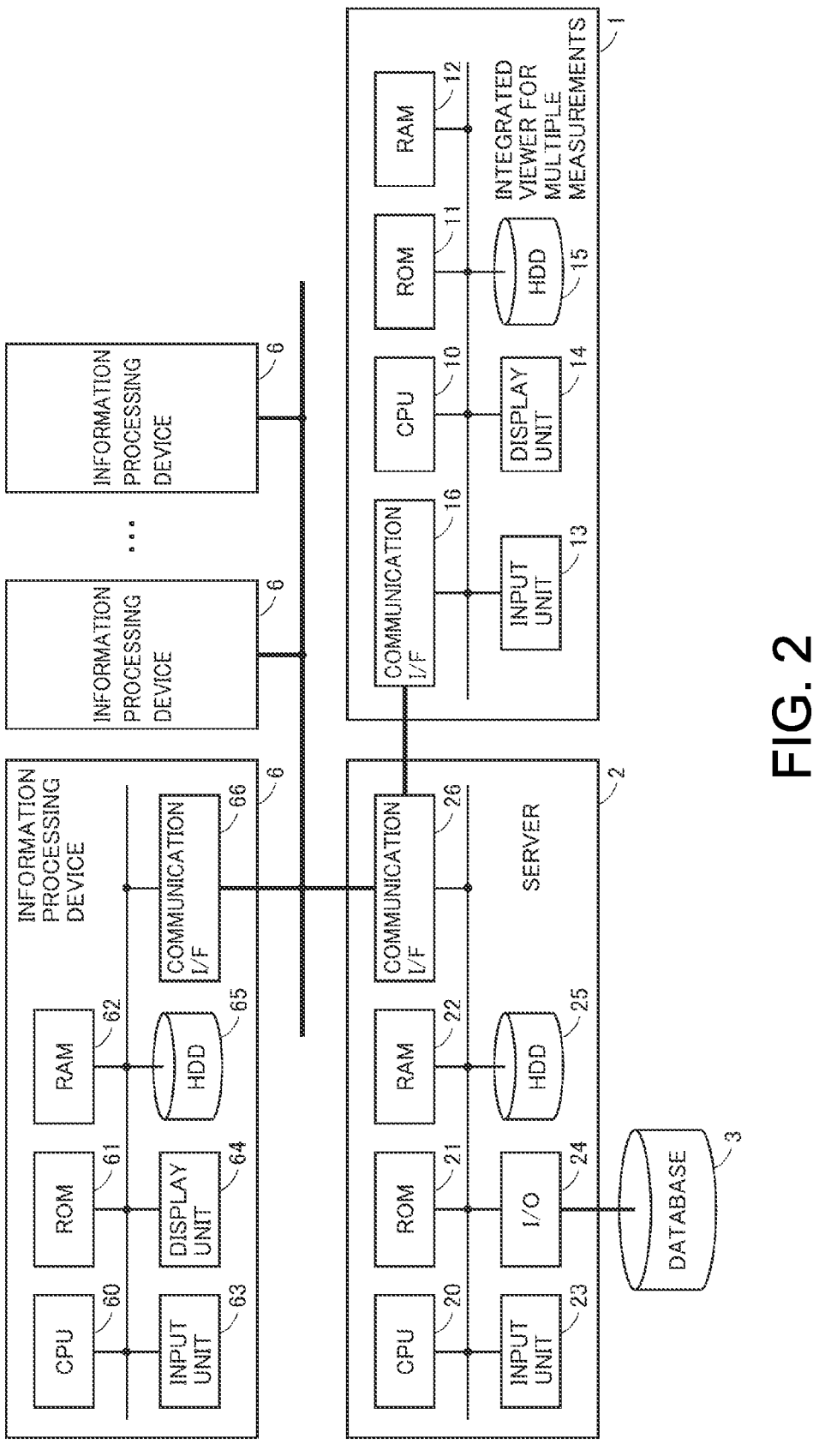
FIG. 2 is a diagram schematically illustrating a hardware configuration example of an information processing device, a server, and the viewer.

FIG. 2 is a diagram schematically illustrating a hardware configuration example of information processing device 6, server 2, and viewer 1.

(Hardware Configuration of Information Processing Device)

Referring to FIG. 2, information processing device 6 is provided with a central processing unit (CPU) 60 for entirely controlling analyzer 4 and a storage unit for storing programs and data, and is configured to be operated according to the programs.

The storage unit includes a read only memory (ROM) 61, a random access memory (RAM) 62, and a hard disk drive (HDD) 65. ROM 61 can store programs to be executed by CPU 60. RAM 62 can temporarily store the data to be used during the execution of the program by CPU 60 and can function as a temporary data memory to be used as a working area. HDD 65 is a non-volatile storage device and can store information generated by information processing device 6 such as the data file for each sample. In addition to or in place of HDD 65, a semiconductor memory device such as a flash memory may be employed.

Information processing device 6 further includes a communication interface (I/F) 66, an input unit 63, and a display unit 64. Communication I/F 66 is an interface for information processing device 6 to communicate with an external device including device body 5 and server 2.

Input unit 63 receives an input including an instruction to information processing device 6 from the user (e.g., analyst). Input unit 63 includes a keyboard, a mouse, a touch panel integrally formed with a display screen of display unit 64, and the like, and receives the measurement conditions and the identification information of the sample.

Display unit 64 can display, for example, an input screen for measurement conditions and the identification information of the sample at the time of setting the measurement conditions. During the measurement, display unit 64 can display the measurement data detected by device body 5 and data analysis results by information processing device 6.

The processing by analyzer 4 is achieved by each hardware and software executed by CPU 60. In some cases, such software is stored in advance in ROM 61 or HDD 65. Further, the software is sometime stored in a storage medium (not shown) and distributed as a program product. The software is read out from HDD 65 by CPU 60 and stored in RAM 62 in a format executable by CPU 60. CPU 60 executes the program.

(Hardware Configuration of Server)

Server 2 includes a CPU 20 for controlling the entire device and a storage unit for storing programs and data, and is configured to be operated according to the programs. The storage unit includes a ROM 21, a RAM 22, and an HDD 25.

ROM 21 can store programs to be executed by CPU 20. RAM 22 can temporarily store the data to be used during the execution of the program by CPU 20 and can function as a temporary data memory to be used as a working area. HDD 25 is a non-volatile storage device and can store the information transmitted from information processing device 6.

Server 2 further includes a communication I/F 26, an input/output interface (I/O) 24, and an input unit 23. Communication I/F 26 is an interface for server 2 to communicate with an external device including information processing device 6 and viewer 1.

I/O 24 is an interface for input to server 2 or output from server 2. I/O 24 is connected to database 3. Database 3 is a memory for storing data transmitted and received between server 2 and information processing device 6.

Input unit 23 receives an input including an instruction from the user (for example, an administrator of analysis system 100). Input unit 23 includes a keyboard, a mouse, and the like and receives the information regarding the physical property value of the sample or the like.

(Hardware Configuration of Viewer)

Viewer 1 includes a CPU 10 for controlling the entire device and a storage unit for storing programs and data, and is configured to be operated according to the programs. The storage unit includes a ROM 11, a RAM 12, and an HDD 15.

ROM 11 can store programs to be executed by CPU 10. RAM 12 can temporarily store the data to be used during the execution of the program by CPU 10 and can function as a temporary data memory to be used as a working area. HDD 15 is a non-volatile storage device and can store the information transmitted from server 2.

Viewer 1 further includes a communication I/F 16, an input unit 13, and a display unit 14. Communication I/F 16 is an interface for viewer 1 to communicate with an external device including server 2.

Input unit 13 receives an input including an instruction to viewer 1 from the user (for example, the operator). Input unit 13 includes a keyboard, a mouse, a touch panel integrally formed with a display screen of display unit 14, and the like, and receives a selection of a display object or the like.

During selection of display objects, display unit 14 can display a user interface such as an operation screen for selecting a display object. Display unit 14 can further display measurement data such as a generated sample image.

The processing performed by viewer 1 is achieved by each hardware and software executed by CPU 10. In some cases, such software is stored in advance in ROM 11 or HDD 15. Further, the software is sometime stored in a storage medium (not shown) and distributed as a program product. The software is read out from HDD 15 by CPU 10 and stored in RAM 12 in a format executable by CPU 10. CPU 10 executes this program.

[Functional Configuration of Analysis System]

Figure 3:
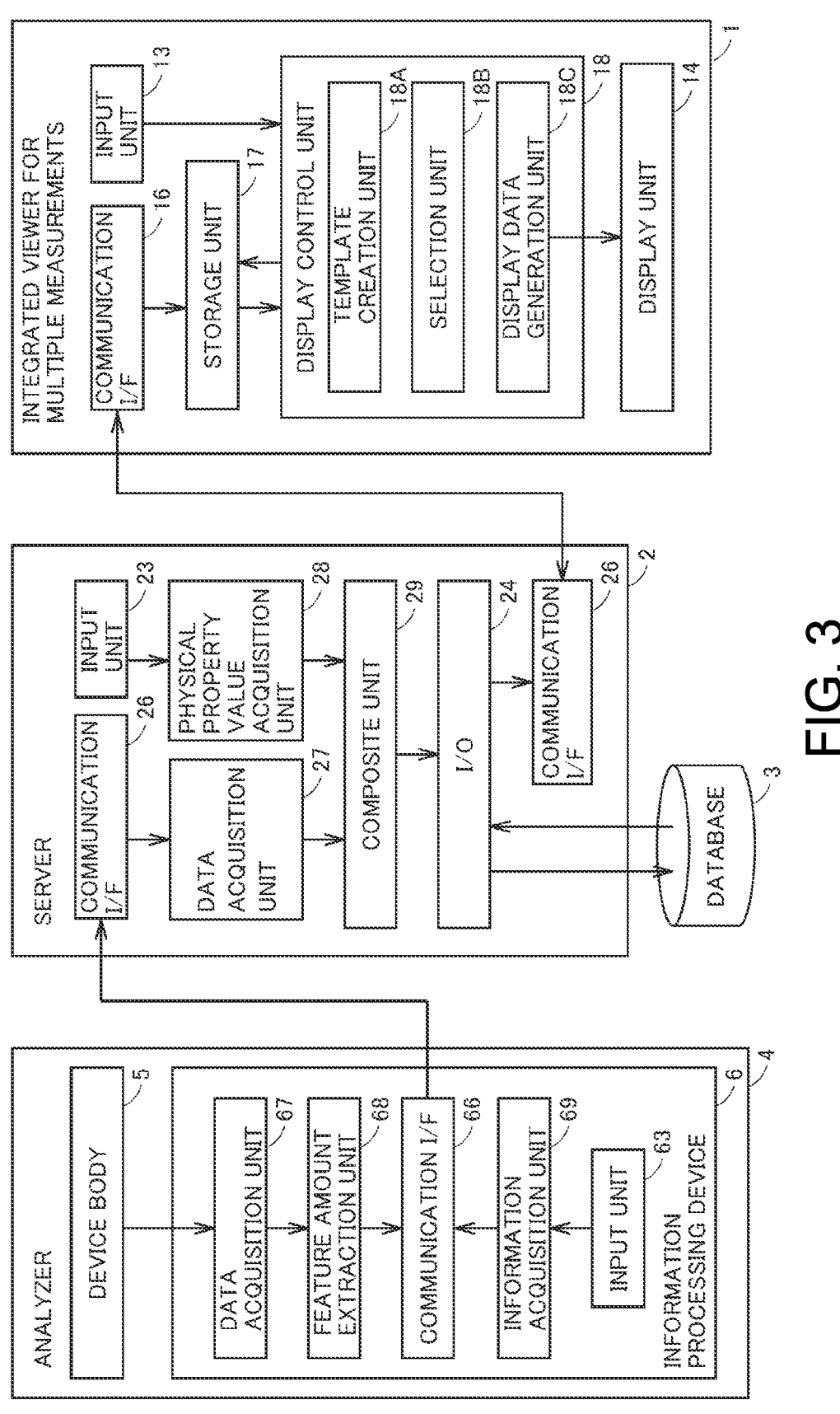
FIG. 3 is a diagram schematically illustrating a functional configuration of the information processing device, the server, and the viewer.

FIG. 3 is a diagram schematically illustrating a functional configuration of information processing device 6, server 2, and viewer 1.

(Functional Configuration of Information Processing Device)

Referring to FIG. 3, information processing device 6 includes a data acquisition unit 67, a feature amount extraction unit 68, and an information acquisition unit 69. These functional configurations are achieved by CPU 60 executing predetermined programs in information processing device 6 illustrated in FIG. 2.

Data acquisition unit 67 acquires measurement data indicating the measurement result of the sample from device body 5. In a case where, for example, analyzer 4 is a chromatograph mass spectrometer, the measurement data includes chromatograms and mass spectra. In a case where analyzer 4 is a scanning electron microscope or a transmission electron microscope, the measurement data includes image data showing a microscopic image of the sample. Data acquisition unit 67 transfers the acquired measurement data to feature amount extraction unit 68.

Feature amount extraction unit 68 analyzes the measurement data transferred from data acquisition unit 67 using dedicated data analysis software to extract the feature amount of the sample. The feature amount of the sample includes, for example, components contained in the sample, the particle diameter of a particle having the components, the peak intensity and the peak area of the spectrum, the absorbance, the reflectance, the Young's modulus, the tensile strength, the deformation amount, the strain amount, and the breaking time. For example, when the measurement data is a chromatogram, the feature amount includes a peak intensity, a peak area, and a retention time.

Information acquisition unit 69 acquires the information received by input unit 63. Specifically, information acquisition unit 69 acquires the sample identification information and the information regarding the sample measurement conditions. The sample identification information includes, for example, a sample name, and a name, a model number, a serial number, etc., of a product to be served as a sample. The measurement conditions of the sample include device parameters including a name and a model number of an analyzer to be used and measurement parameters indicating the measurement conditions such as an application condition of a voltage and/or a current or a temperature condition.

Communication I/F 66 transmits the acquired measurement data, the measurement conditions, the sample identification information, and the extracted feature amount to server 2 as a data file.

(Functional Configuration of Server)

Server 2 has a data acquisition unit 27, a physical property value acquisition unit 28, and a composite unit 29. These functional configurations are achieved by CPU 20 executing predetermined programs in server 2 illustrated in FIG. 2.

Data acquisition unit 27 acquires the data file transmitted from information processing device 6 of each analyzer 4 via communication I/F 26.

Physical property value acquisition unit 28 acquires the information indicating the physical property value of the sample received by input unit 23. The physical property value of the sample is a value indicating the attribute of the sample acquired by information other than the measurement by analyzer 4. The physical property value of the sample includes, for example, a value indicating the property of the sample or a value (such as the number of years of use) indicating the degree of deterioration of the sample.

The composite unit 29 associates the data file (sample identification information, measurement conditions, measurement data, and feature amount) by analyzer 4 with the physical property value for each sample. The composite unit 29 stores the data files associated for each sample in database 3 via I/O 24. In a case where there are a plurality of data files by a plurality of types of analyzers 4 for one sample, server 2 generates one data file by collecting the data files and stores the generated data file in database 3 in association with the physical property value. Thus, at least one data file and physical property value are accumulated in database 3 for each sample.

(Control Configuration of Viewer)

Viewer 1 includes a storage unit 17 and a display control unit 18. These functional configurations are achieved by CPU 10 executing predetermined programs in viewer 1 illustrated in FIG. 2.

Storage unit 17 is configured to store the type of a feature amount acquired from the measurement data of analyzer 4 for each of the plurality of types of analyzers 4. For example, when analyzer 4 is a chromatograph mass spectrometer and the measurement data is a chromatogram, the type of the feature amount includes a peak intensity, a peak area, and a retention time. Alternatively, when analyzer 4 is a transmission electron microscope (TEM) and the measurement data is image data indicating a microscopic image of a sample, the type of the feature amount includes the particle diameter of a particle included in the sample. Storage unit 17 corresponds to one example of a "storage unit".

Display control unit 18 selects an object to be displayed on display unit 14 according to the user instruction received by input unit 13, and generates display data in a display format displayable on the display screen of display unit 14 on the basis of the selected display object. Display control unit 18 further generates a user interface for enabling the user to perform an operation of selecting a display object. Specifically, display control unit 18 includes a template creation unit 18A, a selection unit 18B, and a display data generation unit 18C.

Template creation unit 18A creates a screen (hereinafter also referred to as a "template creation screen") for supporting creation of a template as a user interface. In the present specification, the "template" defines a set of types of feature amounts used for machine learning and the like. As will be described later, the user can select a type of the feature amount on the template creation screen, and create a template defining the selected type of the feature amount.

The type of the feature amount used for machine learning or the like varies depending on the purpose and application of the analysis. In the present embodiment, it is possible to create a template defining a set of types of feature amounts for each purpose and application of analysis using the template creation screen. Accordingly, in a scene where analysis is performed, the user can easily acquire the feature amount according to the purpose and application of the analysis by selecting a template suitable for the purpose and application of the analysis from among the plurality of templates.

Selection unit 18B selects an object to be displayed on the display screen of display unit 14 in accordance with the user instruction received by input unit 13. The selection of the display object includes selection of a sample and selection of a template. Selection unit 18B displays, as a user interface, an operation screen for selecting a display object on the display screen of display unit 14. The operation screen displays information indicating the contents of the data stored in database 3. The user can perform a selecting operation on the operation screen using input unit 13.

Specifically, selection unit 18B selects at least two or more samples from the plurality of samples analyzed by at least one analyzer 4 of the plurality of types of analyzers 4 (see FIG. 1) according to the selecting operation by the user. Selection unit 18B further selects a template from among the plurality of templates according to the selecting operation by the user.

Display data generation unit 18C accesses server 2 via Internet 7 to acquire the data file of the sample selected as the display object from database 3. As described above, the data file includes the measurement data and measurement condition of the sample by each analyzer 4, the sample identification information, and the feature amount of the sample extracted from the measurement data. Further, the physical property value of the sample is associated with the data file.

Display data generation unit 18C extracts the measurement data of analyzer 4 from the data file acquired from database 3. Display data generation unit 18C also extracts the feature amount and the physical property value of the sample defined in the template selected by selection unit 18B. Display data generation unit 18C generates display data in a display format displayable on the display screen using the measurement data and the feature amount and physical property value of the sample that have been extracted.

Display control unit 18 displays the display data generated by display data generation unit 18C on the display screen of display unit 14. When input unit 13 receives a user instruction for a display format, display control unit 18 can change the display format in accordance with the user instruction. Display control unit 18 corresponds to one example of a "display control unit" and a "registration unit".

[Operation of Analysis System]

Next, the operation of analysis system 100 will be described. In the following, template creation processing and display processing performed by viewer 1 will be mainly described.

(1) Template Creation Processing

Figure 4:
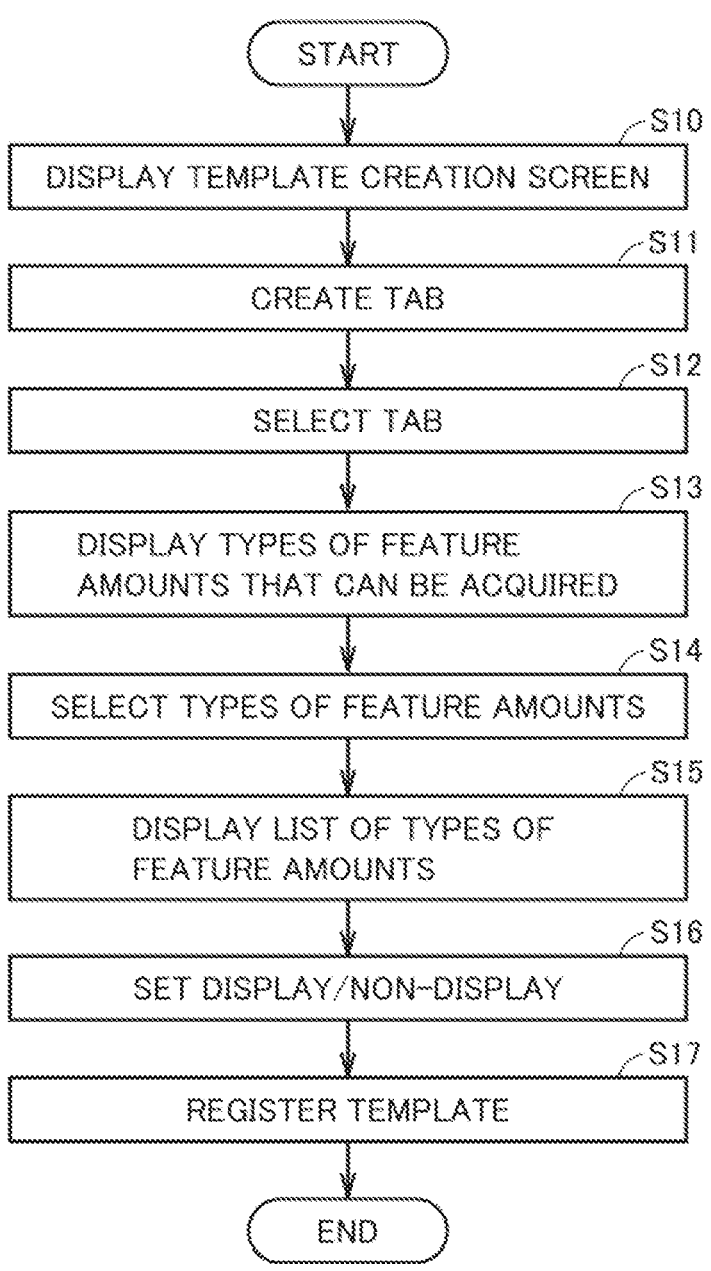
FIG. 4 is a flowchart for describing template creation processing performed by the viewer.

FIG. 4 is a flowchart for describing the template creation processing performed by viewer 1. The program according to the flowchart of FIG. 4 is stored in advance in ROM 11 of viewer 1. The processing is achieved by CPU 10 executing the program.

Figure 5:
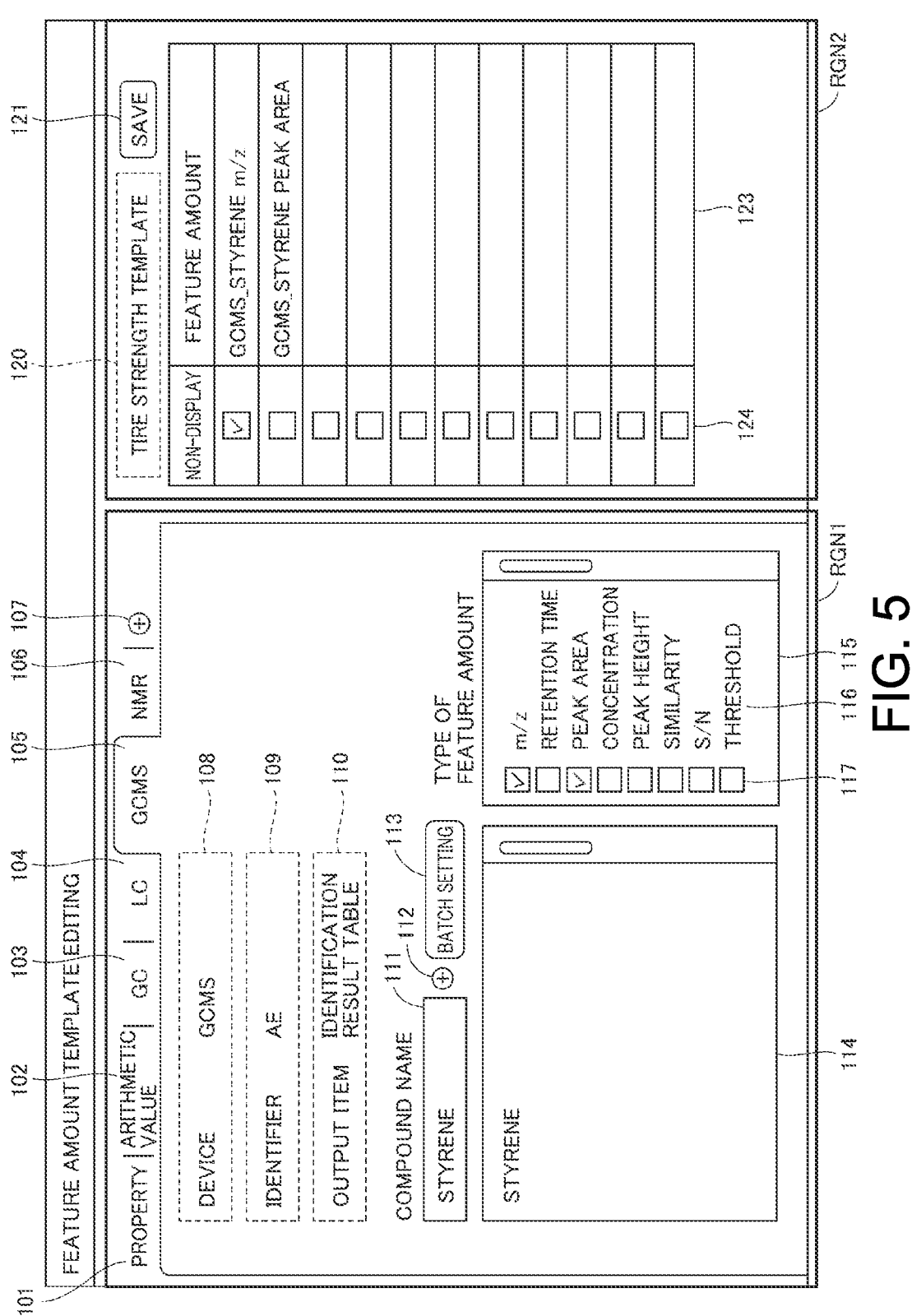
FIG. 5 is a diagram illustrating an example of a template creation screen.
Figure 6:
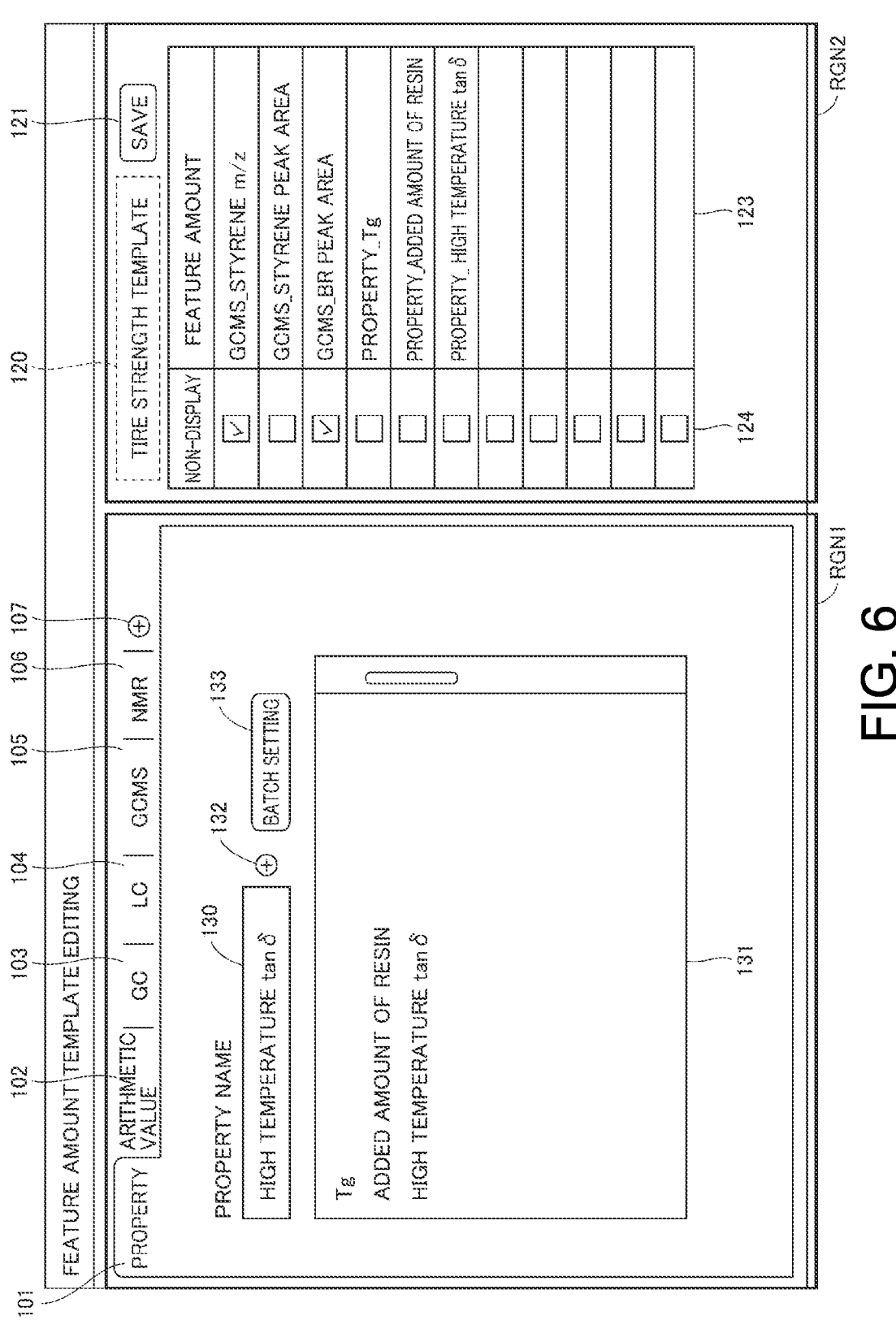
FIG. 6 is a diagram illustrating an example of the template creation screen.
Figure 7:
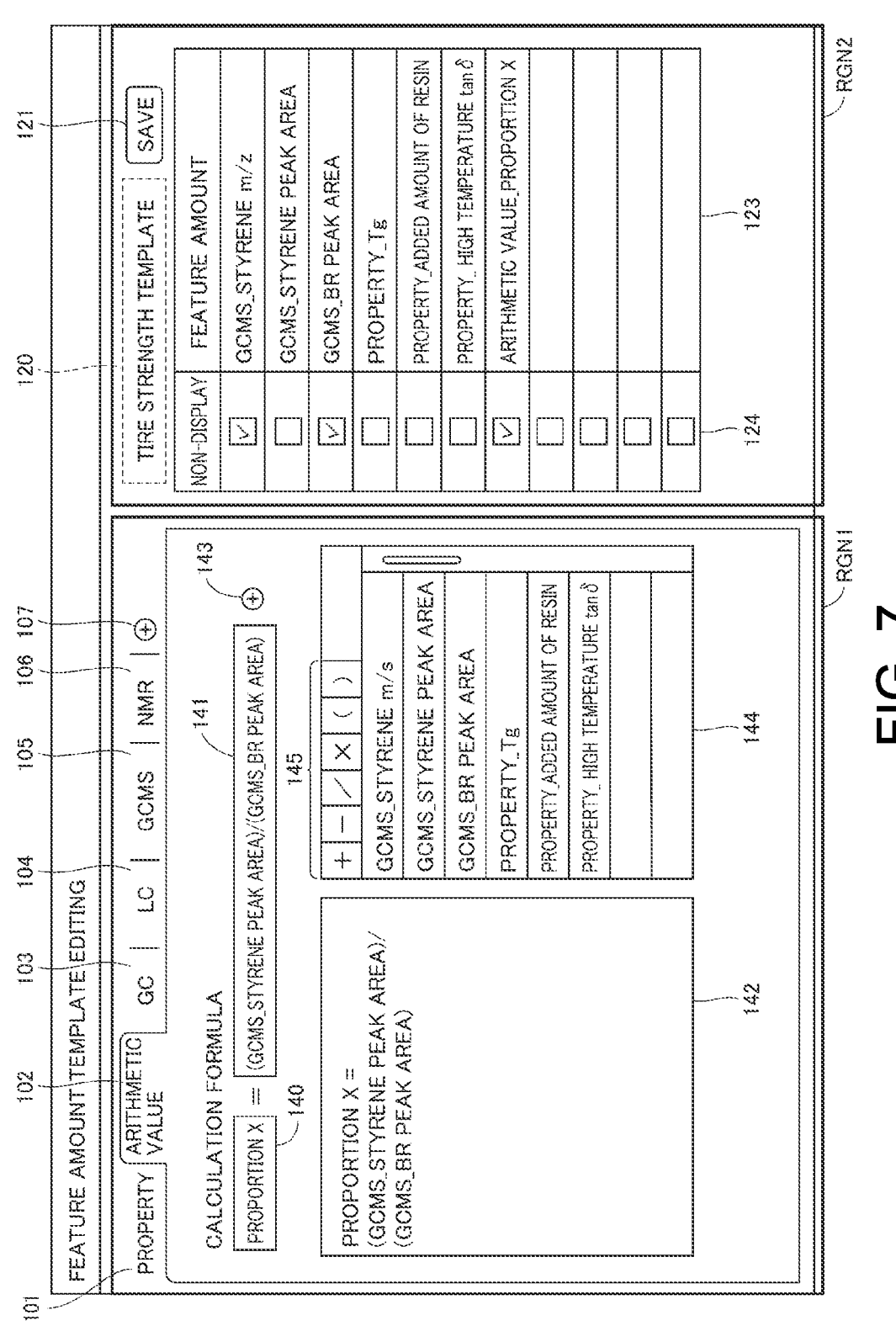
FIG. 7 is a diagram illustrating an example of the template creation screen.

When input unit 13 receives an instruction to start creation of a template, viewer 1 starts the processing illustrated in FIG. 4. Viewer 1 first displays a template creation screen on display unit 14 in step S10. FIGS. 5 to 7 are diagrams illustrating an example of the template creation screen. The template creation screen can be generated based on the data stored in database 3.

Referring to FIG. 5, the template creation screen includes a first display region RGN1 and a second display region RGN2. In first display region RGN1, a plurality of tabs can be displayed in a switchable manner. In an initial state of the template creation screen, there are only a tab 101 and a tab 102 in first display region RGN1. Tab 101 is a tab (hereinafter also referred to as "property tab") for setting a physical property value of the sample. Tab 102 is a tab (hereinafter also referred to as an "arithmetic value tab") for setting an arithmetic value obtained by performing arithmetic processing on one or more feature amounts.

The user can newly create and add a tab in first display region RGN1. The tab can be created by the following procedure. First, when the user clicks a button 107 displayed in first display region RGN1, a tab creation screen is displayed in first display region RGN1. The user can set the name of analyzer 4, the identifier of the data file, and a name attached to the tab to be created on this screen.

The identifier of the data file means an identifier included in a file name of the data file. As described above, the identifier is used to identify information that is not directly involved in the measurement by analyzer 4.

The user can freely set the tab name. The tab name is unique identification information in one template file, and a plurality of tabs having the same name are not present in one template file.

When the name of analyzer 4, the identifier, and tab name are set on the tab creation screen, a tab is added to first display region RGN1. The tab is given the tab name set at the time of creating the tab. In the example of FIG. 5, a plurality of tabs 103 to 106 are added, and the name of analyzer 4 set at the time of creating the tab is attached to each tab.

Each of the plurality of tabs 103 to 106 is configured to display the type of the feature amount that can be acquired from the measurement data of corresponding analyzer 4. Specifically, tab 103 displays the type of the feature amount obtained from the measurement data of a gas chromatograph (GC). Tab 104 displays the type of the feature amount obtained from the measurement data of a liquid chromatograph (LC). Tab 105 displays the type of the feature amount obtained from the measurement data of a gas chromatograph mass spectrometer (GC-MS). Tab 106 displays the type of the feature amount obtained from measurement data of a nuclear magnetic resonator (NMR).

When the user clicks any one of tabs 103 to 106, the detail of the clicked tab is displayed in first display region RGN1. In the example of FIG. 5, the detail of tab 105 is displayed in first display region RGN1.

Tab 105 displays a text box 108 for designating analyzer 4, a text box 109 for designating an identifier of a data file, and a text box 110 for designating an output item. Tab 105 further displays text boxes 111 and 114 and buttons 112 and 113 for specifying a compound name.

A name of analyzer 4 "GCMS" is displayed in text box 108, and an identifier "AE" is displayed in text box 109. The user sets these pieces of information on the tab creation screen when creating tab 105.

The output item specifies a measurement result to be used for extraction of a feature amount among a plurality of analysis results obtained by set analyzer 4. The user can input the type of the measurement result in text box 110. In the example of FIG. 5, an "identification result table" is input in text box 110. Note that viewer 1 may be configured such that, instead of or in addition to the input of the type of measurement result into text box 110, the user can select a desired measurement result from among a plurality of analysis results.

Tab 105 displays types of feature amounts acquirable from the data file specified based on these three pieces of information (analyzer, identifier, output item). However, among the above three pieces of information, the identifier is not necessary, and thus, the designation of the identifier can be omitted. In this case, one tab displays types of the feature amounts acquirable from a data file specified based on the analyzer and the output item.

In the example of FIG. 5, a data file whose file name includes an identifier "AE" is extracted from a plurality of data files storing measurement data of the gas chromatograph mass spectrometer (GC-MS). Then, types of feature amounts that can be obtained from the identification result table stored in the extracted data file are displayed in tab 105.

In tab 105, the compound name for the feature amounts is designated in order to display the types of the feature amounts that can be acquired from the identification result table. Text box 114 is a user interface for designating the compound name for the feature amounts acquirable from the identification result table. The user inputs a compound name for a desired feature amount in text box 111 and clicks button 112, by which the compound name can be written in text box 114. In the example of FIG. 5, when button 112 is clicked in a state where "styrene" is input in text box 111, "styrene" is written in text box 114.

In addition to the above configuration, viewer 1 may have a configuration in which, when a "batch setting" button 113 is clicked, a compound list is acquired from a comma separated values (CSV) data file or the like, and all the compound names included in the compound list can be collectively added to text box 114.

Alternatively, viewer 1 may be configured such that, when "batch setting" button 113 is clicked, the compound list of the identification result table stored in advance in the analysis data file or the like is acquired, and all the compound names included in the compound list are collectively added to text box 114.

In any of these configurations, the acquired compound list may be displayed in first display region RGN1, and when the user selects a compound name from the displayed compound list, the selected compound name may be added to text box 114. With this configuration, it is possible to prevent inconsistent spelling of compound name.

The user can select a desired compound name from a plurality of compound names displayed in text box 114 by clicking the desired compound name using input unit 13. When one compound name is selected from a plurality of compound names in text box 114, types 116 of the feature amounts of the selected compound name are displayed in text box 115. Types 116 of the feature amounts correspond to the types of the feature amounts of the selected compound name that can be acquired from the identification result table. For example, when "styrene" is selected in text box 114, types 116 of the feature amounts of styrene that can be obtained from the identification result table are displayed in text box 115. In the example of FIG. 5, m/z (mass-to-charge ratio), retention time, peak area, concentration, peak height, similarity, S/N, and a threshold are displayed in text box 115 as types 116 of the feature amounts of styrene.

A check box 117 is displayed next to type 116 of each feature amount. The user can select the type of the feature amount by operating first display region RGN1 using input unit 13. Specifically, the user can select the type of the feature amount by checking check box 117 (putting a check mark in FIG. 5) displayed next to type 116 of the feature amount displayed in text box 115. The selected type of the feature amount is displayed in second display region RGN2.

In the example of FIG. 5, "m/z" and "peak area" are checked in text box 115. In this case, "m/z of styrene" and "peak area of styrene" are selected and displayed in second display region RGN2.

The types of the feature amounts selected in first display region RGN1 are displayed in second display region RGN2 in the form of a list 123. In the example of FIG. 5, two types of the feature amounts which are "GCMS_styrene m/z" and "GCMS_styrene peak area" are displayed in list 123. The name of each feature amount can include information of tab 105 used to select the feature amount. For example, the name of each feature amount can include "GCMS" which is the name of tab 105. Alternatively, the name of analyzer 4 and the identifier corresponding to tab 105 can be included in the name of each feature amount.

A check box 124 is displayed next to the type of each feature amount displayed in list 123. The user can set whether to display or hide the corresponding feature amount by checking check box 124 (putting a check mark in FIG. 5). Accordingly, some of the feature amounts used for machine learning or the like can be prevented from being displayed on display unit 14. For example, the feature amount that is used to calculate an arithmetic value in an arithmetic value tab 102 to be described later but does not need to be used in the machine learning and does not need to be displayed can be set to be hidden.

List 123 of the types of feature amounts created in second display region RGN2 can be registered in storage unit 17 as a template. During registration, the user can give a unique name to the created template. Specifically, the user can input a name for identifying the template in text box 120 of second display region RGN2. The template can be given a name that allows the user to easily identify the content of the template, such as the purpose or application of analysis using the template. In the example of FIG. 5, the name "tire strength template" is given to indicate that the template is used to analyze the strength of a tire which is a sample. The user can register the "tire strength template" in storage unit 17 by clicking button 121 indicated in second display region RGN2.

The template creation processing described above can be summarized in the flowchart of FIG. 4. Returning to FIG. 4, when receiving the input operation from the user on the template creation screen, viewer 1 creates a template according to the input operation in steps S11 to S17, and registers the created template in storage unit 17 together with the name.

Specifically, when the user clicks button 107 displayed in first display region RGN1 of the template creation screen, display control unit 18 (template creation unit 18A) displays the tab creation screen in first display region RGN1 in step S11. When the name of analyzer 4, the identifier, and a tab name are set on the tab creation screen, display control unit 18 creates a tab having the set tab name and adds the tab in first display region RGN1.

Next, when the user clicks any one of the plurality of added tabs 103 to 106, display control unit 18 (template creation unit 18A) selects the clicked tab and displays the selected tab in first display region RGN1 in step S12.

Display control unit 18 proceeds to step S13, and displays, in this tab, types 116 of feature amounts that can be acquired from the data file specified based on analyzer 4, the identifier, and the output item in text box 115. In step S13, display control unit 18 adds check box 117 to each of types 116 of the acquirable feature amounts, thereby displaying the types of the feature amounts in a selectable manner.

Next, when the user checks check box 117 attached to type 116 of each feature amount, display control unit 18 selects the checked type of the feature amount in step S14. In step S15, display control unit 18 displays the selected type of the feature amount in second display region RGN2 in the form of list 123. In step S15, display control unit 18 adds check box 124 to the type of each feature amount indicated in list 123, so that display/non-display can be set for the type of each feature amount.

When the user checks check box 124 attached to the type of each feature amount indicated in list 123, display control unit 18 proceeds to step S16 and sets display/non-display of the type of each feature amount according to the input.

The processes in steps S12 to S16 are executed every time the user clicks any one of tabs 103 to 106. Finally, a list of selected types of feature amounts is displayed in list 123 for each tab.

In step S17, when button 121 is clicked by the user, display control unit 18 registers list 123 of the types of feature amounts created in second display region RGN2 in storage unit 17 together with the name input to text box 120.

As described above, the template creation screen has first display region RGN1 that displays types of feature amounts as a tab for each type of analyzer 4 and second display region RGN2 that displays a set of types of feature amounts selected by the user. First display region RGN1 and second display region RGN2 are displayed side by side. With this configuration, the user can select the feature amount in first display region RGN1 while checking the display content of second display region RGN2, so that the user can easily create a template.

Since types of feature amounts that can be acquired from the measurement data vary depending on the type of analyzer 4, information to be displayed in first display region RGN1 varies between analyzers 4. A tab is provided for each analyzer 4 in first display region RGN1, by which the user can select the feature amount by opening the tab that matches the purpose or application of the analysis.

Furthermore, one tab can be set based on analyzer 4, the identifier, and the output item (or analyzer 4 and the output item), whereby types of feature amounts obtained from the measurement data of one type of analyzer 4 can be subdivided and displayed. Accordingly, the type of the feature amount can be more easily selected, and thus, it is possible to facilitate the creation of template.

Here, as illustrated in FIG. 5, property tab 101 for setting a physical property value of a sample and arithmetic value tab 102 for setting an arithmetic value obtained by performing arithmetic processing on one or a plurality of feature amounts are displayed in first display region RGN1 of the template creation screen in addition to tabs 103 to 106 for displaying types of feature amounts that can be acquired from measurement data of corresponding analyzer 4. The user can add the physical property value and the arithmetic value of the desired sample to the template as the type of the feature amount by operating these tabs 101 and 102. As a result, the physical property value and the arithmetic value of the sample can be used for analysis such as machine learning.

FIG. 6 illustrates a template creation screen when property tab 101 is selected. As illustrated in FIG. 6, text boxes 130 and 131 and a button 132 for setting the physical property value of the sample are displayed in property tab 101. Text box 131 is a user interface for designating a physical property value name of the sample. Text box 130 is a user interface for writing a physical property value name in text box 131.

The user can input the physical property value name in text box 130 using input unit 13. In the example of FIG. 6, "high temperature tan δ" (mechanical loss factor at high temperature (around 60° C.)) is input in text box 130 for a physical property value name. When button 132 is clicked in this state, the input physical property value name is written in text box 131.

In addition to the above configuration, viewer 1 may have a configuration in which, when a "batch setting" button 133 is clicked, a physical property value list is acquired from a CSV data file or the like, and all the physical property value names included in the physical property value list can be collectively added to text box 131.

Alternatively, viewer 1 may be configured such that, when "batch setting" button 133 is clicked, the physical property value list stored in advance in a physical property value measurement data file or the like is acquired, and all the compound names included in the list are collectively added to text box 131.

The physical property value name of the sample written in text box 131 by the above processing is simultaneously added to list 123 of the types of feature amounts indicated in second display region RGN2. In the example of FIG. 6, "high temperature tan δ", "added amount of resin", and "Tg (glass transition temperature of tire)" are input in text box 131. Accordingly, "property_high temperature tan δ", "property_added amount of resin", and "property_Tg" are added to list 123 of second display regions RGN2. Note that the name of each physical property value can include information (for example, property) indicating that it is a physical property value of the sample.

Similar to the type of feature amount, a check box 124 is displayed next to each physical property value in list 123. The user can set whether to display or hide the corresponding physical property value by checking check box 124 (putting a check mark in FIG. 6).

FIG. 7 illustrates a template creation screen when arithmetic value tab 102 is selected. As illustrated in FIG. 7, text boxes 140 to 142, a button 143, and a setting tool 144 for setting an arithmetic value are displayed in arithmetic value tab 102. Text box 140 is used to set the name of the arithmetic value, and text box 141 is used to set a calculation formula for deriving the arithmetic value.

The user can set the calculation formula using setting tool 144. Setting tool 144 includes the type of the feature amount (including the physical property value) displayed in list 123 of second display region RGN2 and an icon 145 indicating a symbol of operation (for example, +, −, /, x, etc.). The user can create the calculation formula by selecting the type of the feature amount and the symbol of operation using input unit 13. In the example of FIG. 7, the arithmetic value "proportion X" is defined by a value (=(styrene peak area)/(BR peak area)) obtained by dividing "styrene peak area" by "BR (butadiene) peak area". When button 143 is clicked in this state, the created arithmetic value "proportion X" is written in text box 142.

The arithmetic value "proportion X" written in text box 142 is simultaneously added to list 123 of the types of feature amounts in second display region RGN2. In the example of FIG. 7, "arithmetic value_proportion X" is added to list 123. The name of arithmetic value can include information (for example, arithmetic value) indicating that it is an arithmetic value.

[Other Configuration Examples]

(1-1) Rearrangement Function of Feature Amounts

List 123 displayed in second display region RGN2 of the template creation screen (see FIGS. 5 to 7) is configured to be able to change the arrangement order of the types of feature amounts. Specifically, the user performs a moving operation (drag and drop) in a state where one type of feature amount is selected using input unit 13, thereby being capable of changing the arrangement order so as to be suitable for the purpose or application of the analysis.

(1-2) Grouping Function of Feature Amounts

Furthermore, list 123 is configured such that a plurality of types of feature amounts can be grouped. The user can execute grouping by performing a moving operation (drag and drop) on the type of each feature amount using input unit 13. Alternatively, CPU 10 of viewer 1 may perform grouping in accordance with a predetermined rule.

For example, types of a plurality of feature amounts input to list 123 can be classified into an explanatory variable and an objective variable in machine learning. Alternatively, the types of the plurality of feature amounts can be classified into a feature amount based on a measurement condition, a feature amount based on a measurement result, and a feature amount based on a physical property value.

(2) Display Processing

Next, display processing performed by viewer 1 will be described.

Figure 8:
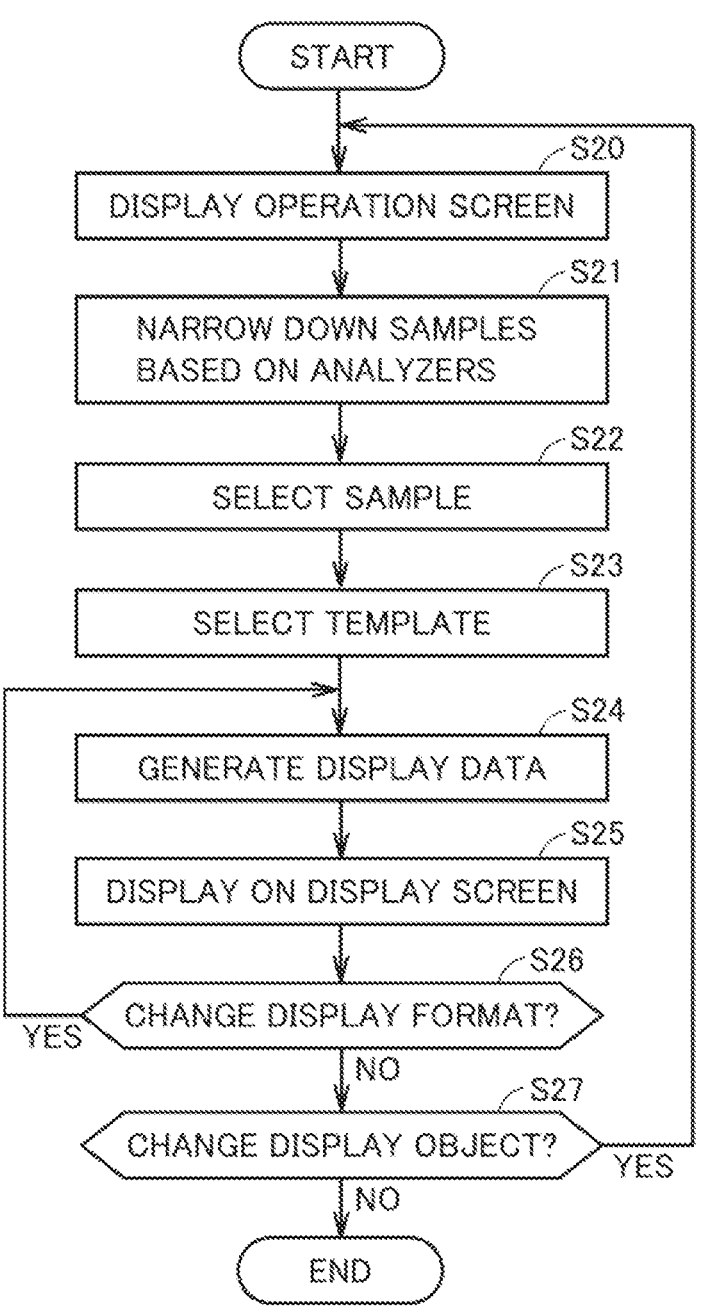
FIG. 8 is a flowchart for describing display processing performed by the viewer.

FIG. 8 is a flowchart for describing the display processing performed by viewer 1. The program according to the flowchart of FIG. 8 is stored in advance in ROM 11 of viewer 1. The processing is achieved by CPU 10 executing the program.

Figure 9:
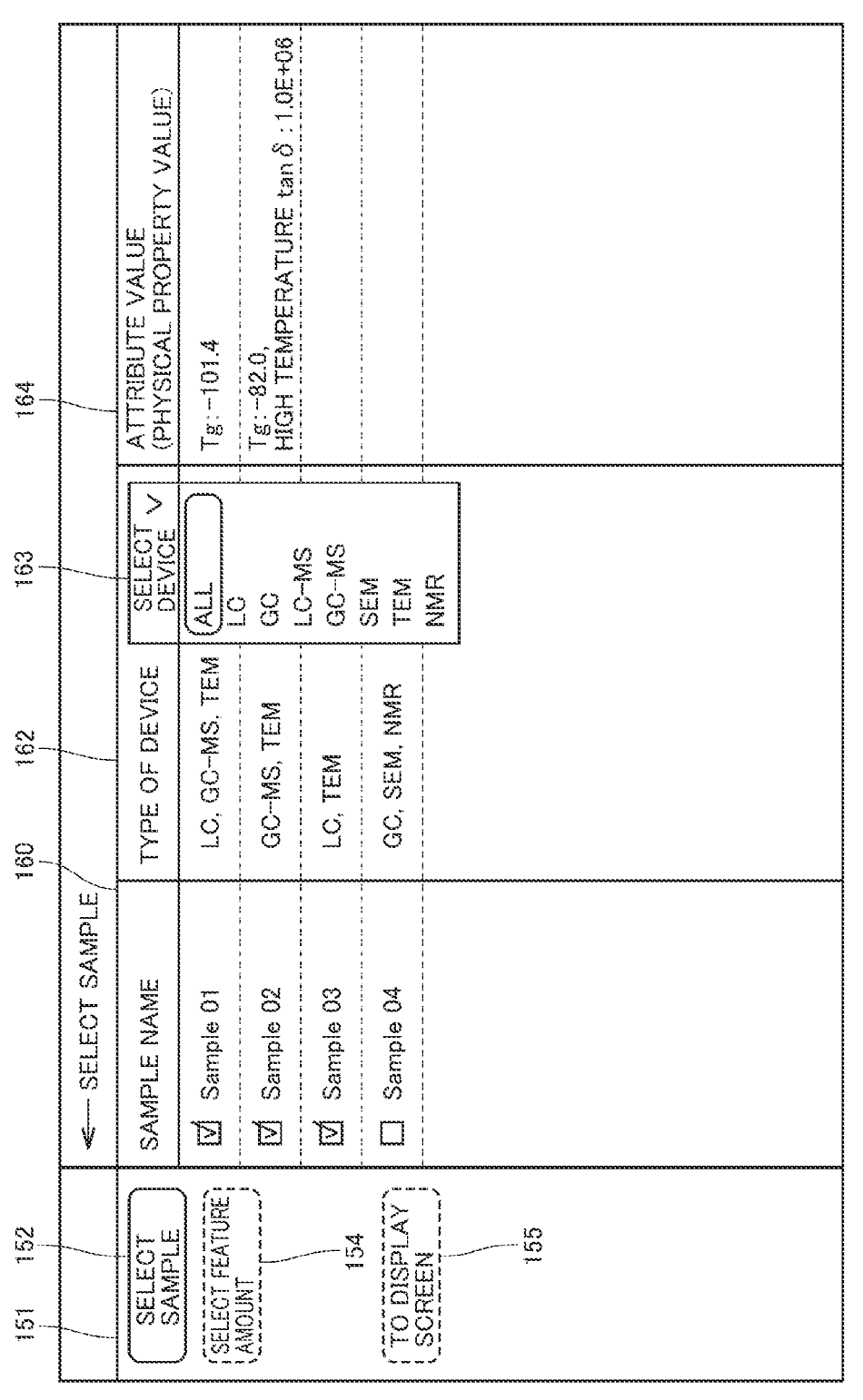
FIG. 9 is a diagram illustrating one example of an operation screen.
Figure 10:
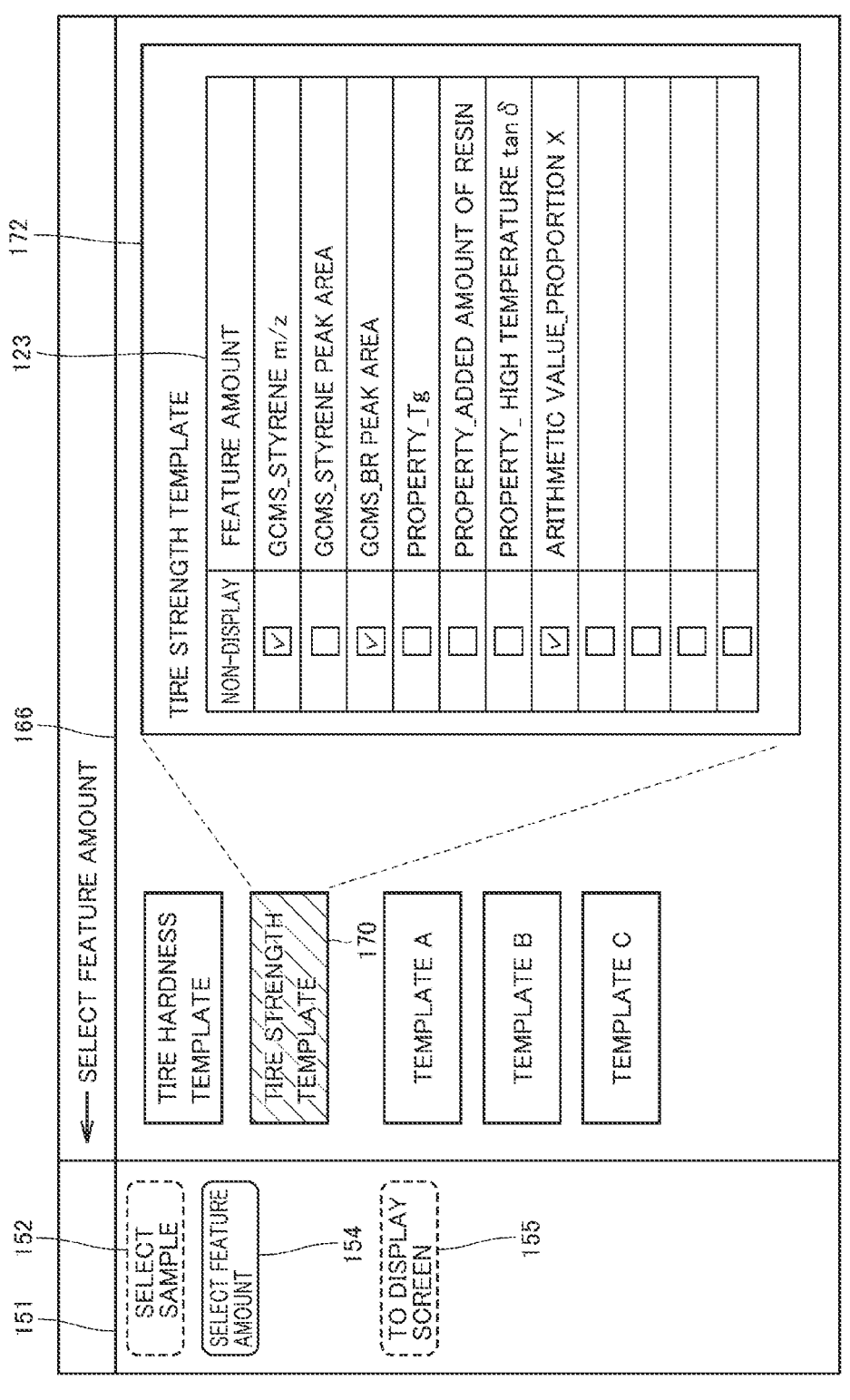
FIG. 10 is a diagram illustrating one example of the operation screen.

When receiving an instruction to start the display operation by input unit 13, viewer 1 starts the display processing illustrated in FIG. 8. Viewer 1 first displays an operation screen for selecting the display object on display unit 14 as a user interface in step S20. FIGS. 9 and 10 are diagrams illustrating one example of the operation screen. The operation screen can be generated based on the data stored in database 3.

Icons 152 and 154 for selection operation and an icon 155 for display operation are displayed in a display region 151 of the operation screen. When the user clicks icon 152 for selecting a sample, a sample-selection operation screen illustrated in FIG. 9 is displayed. A list of samples analyzed by any of the plurality of types of analyzers 4 (see FIG. 1) is displayed in a tabular form in a display region 160 of the sample-selection operation screen. In the example of FIG. 9, sample names (Sample 01 to Sample 04) of four samples are displayed. The product name or the lot number of the sample may be displayed in addition to the sample name as the sample identification information. In the following description, it is assumed that four samples are tires.

In a case where the number of samples to be displayed in display region 160 is large, the user can narrow down the number of samples to be displayed in display region 160 by operating the operation screen illustrated in FIG. 9 using input unit 13. In the example of FIG. 9, the user can narrow down the number of samples using types of analyzers as a clue. Specifically, an icon 163 for narrowing down the number of samples is provided in display region 162 of the operation screen. Icon 163 indicates a list of a plurality of types of analyzers 4. The user can select analyzer 4 corresponding to the measurement data to be displayed by clicking analyzer 4. At this time, the user can simultaneously select two or more analyzers 4. The user can also select all of a plurality of types of analyzers 4 by clicking "All" in icon 163. When analyzers 4 are selected in icon 163, samples measured by selected analyzers 4 are extracted, and a list of the extracted samples is displayed in display region 160 in a tabular form.

The type of at least one analyzer 4 used for the measurement is displayed for each sample in display region 162 of the operation screen. For example, for the sample named "Sample 01", LC, GC-MS, and TEM are indicated as analyzers 4 used for measurement. For the sample named "Sample 02", GC-MS and TEM are indicated.

The attribute values are displayed in display region 164 of the operation screen for each sample. The attribute values of the sample include the physical property value of the sample. In the example of FIG. 9, Tg and high temperature tan δ of the tire are displayed as the physical property values of the sample. Note that the physical property values are attribute values supplied from the outside of analysis system 100, and therefore, there may be a sample that does not have physical property values. Further, the types of physical property values may differ between samples.

The user can select a sample to be displayed by operating the operation screen illustrated in FIG. 9 using input unit 13. In the example of FIG. 9, a sample can be selected by checking the check box (putting a check mark in FIG. 9) arranged next to each sample name.

Next, when the user clicks icon 154 for feature amount selection displayed in region 151 of the operation screen, a feature-amount selection operation screen shown in FIG. 10 is displayed in display unit 14. Referring to FIG. 10, a list of a plurality of templates generated by the above template creation processing is displayed in a region 166 of the feature-amount selection operation screen. In the example of FIG. 10, a total of five templates is displayed as icons. Each icon has a name of a corresponding template.

For example, when an icon 170 indicating "tire strength template" is clicked, an image 172 indicating the detail of the tire strength template is displayed on the operation screen. List 123 of types of feature amounts created using the template creation screen (see FIGS. 5 to 7) is displayed in image 172 of the tire strength template.

Returning to FIG. 8, upon receipt of a selection operation by the user on the operation screen, viewer 1 selects the sample (see FIG. 9) and the template (see FIG. 10) to be displayed in accordance with the selection operation in steps S21 to S23.

Viewer 1 proceeds to step S24 to generate display data. Specifically, viewer 1 accesses server 2 via Internet 7 to acquire the data file of the sample selected in step S23 from database 3.

Next, viewer 1 extracts, for each sample, feature amounts and physical property values specified in the template selected in step S23 from the acquired data file. Viewer 1 generates display data based on the extracted data in step S25.

Figure 11:
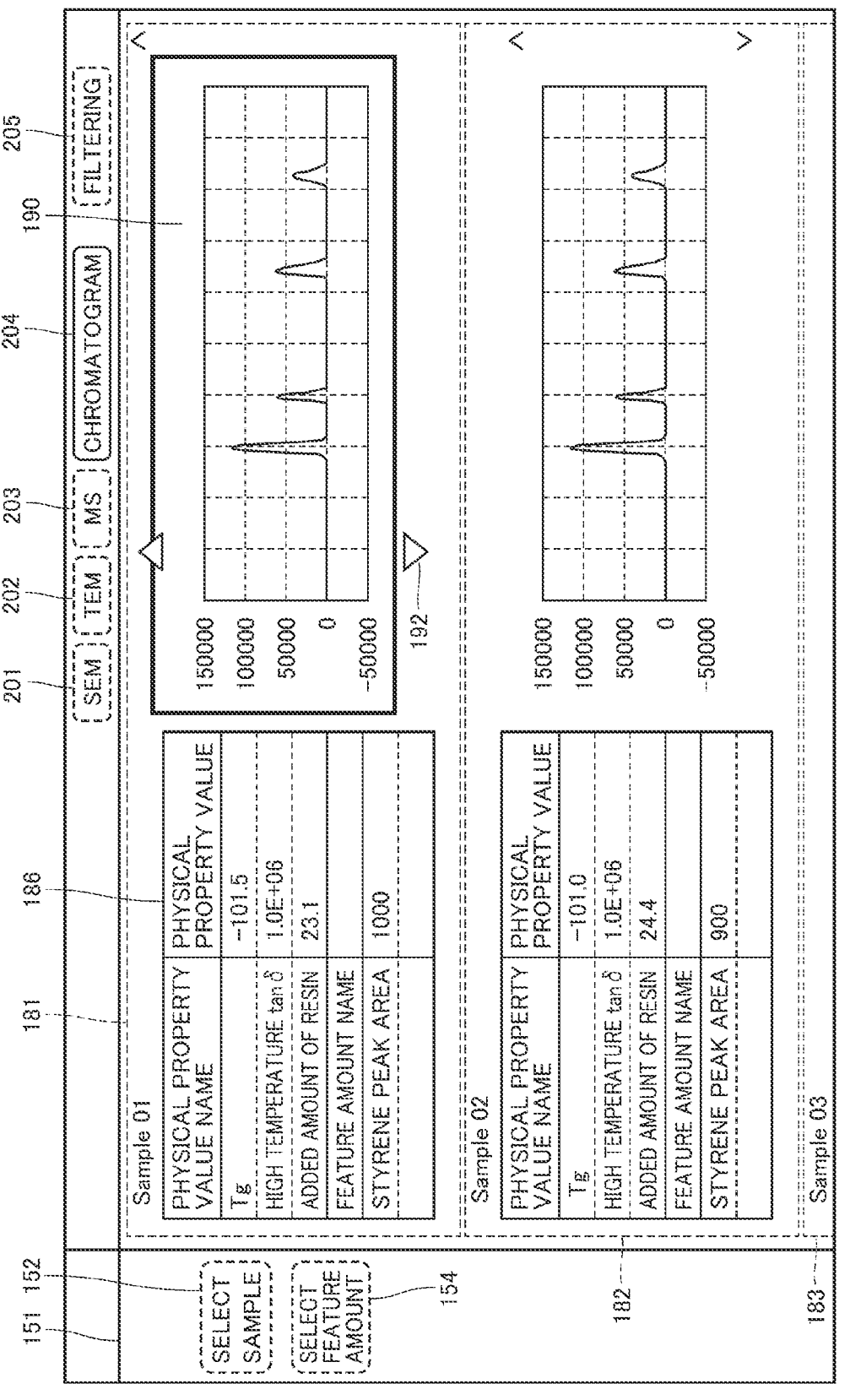
FIG. 11 is a diagram schematically illustrating an example of a display screen of the viewer.

Next, when the user clicks icon 155 for display operation displayed in region 151 of the operation screen, viewer 1 proceeds to step S25 to display the generated display data on the display screen of display unit 14. FIG. 11 is a diagram schematically illustrating an example of the display screen of viewer 1. Note that viewer 1 is configured to be able to switch the display format of the display data in accordance with a user instruction.

In the example of the display screen in FIG. 11, a display region is set for each sample selected as a display object. Specifically, a display region 181 is set for the sample named "Sample 01", a display region 182 is set for the sample named "Sample 02", and a display region 183 is set for the sample named "Sample 03". In the example of the display screen, a plurality of display regions 181, 182, and 183 respectively corresponding to the plurality of samples Sample 01 to Sample 03 are listed. The plurality of display regions 181 to 183 constitute a "list display region" for listing a display region as a whole for each sample. The user can scroll the plurality of display regions 181 to 183 displayed in the list display region in the up-down direction (which corresponds to the vertical direction in the paper surface) by operating input unit 13.

In the display region of each sample, the sample identification information, the measurement data by analyzer 4, and the attribute value (feature amount and physical property value) of the sample are collectively displayed. In the example of FIG. 11, the sample name "Sample 01" which is the sample identification information, a chromatogram 190 that is measurement data, and a list 186 including the feature amounts and the physical property values are displayed in display region 181.

The user can scroll a plurality of chromatograms 190 in the vertical direction by clicking cursors 192 arranged at both ends of chromatogram 190 in the vertical direction. Measurement conditions such as the intensity (Intensity) and the time (Time) can be displayed together in each chromatogram. Note that, when cursor 192 in display region 181 is clicked to scroll chromatogram 190, the chromatograms displayed in the other display regions 182 and 183 may also be scrolled following chromatogram 190 in display region 161.

List 186 is obtained by adding the feature amounts and the physical property values of the sample to list 123 in the template selected on the operation screen of FIG. 10. In list 186, the feature amounts and the physical property values can be classified and displayed. The user can simultaneously view the measurement data by analyzer 4 and the attribute values (feature amounts and physical property values) for one sample. However, the feature amount and the physical property value set to be hidden in list 123 of the tire strength template (in the example of FIG. 10, styrene m/z and proportion X) are not displayed in list 186.

Icons 201 to 204 for switching the measurement data displayed on each display region are arranged above display region 181. Icons 201 to 204 correspond to an SEM image, a TEM image, a mass spectrum (MS), and a chromatogram, respectively. In the example of FIG. 11, it is assumed that a chromatogram is displayed in each display region in response to clicking of icon 204 by the user.

Note that the displays of icons 201 to 204 are not limited thereto and may be appropriately changed so as to correspond to the analysis data of analyzer 4 selected as a display object. For example, in a case where an SEM is not included in analyzer 4 selected to be displayed, the display of icon 201 may be omitted.

A filtering icon 205 for selecting measurement data to be displayed on each display region is further arranged above display region 181. Icon 205 can be used to select a measurement result to be displayed in the display region when the measurement data includes a plurality of measurement results.

In the example of the display screen in FIG. 11, display region 182 and display region 183 have the same configuration as display region 181. That is, in the display screen, measurement data of the same type and feature amounts and physical property values of the same type are listed side by side for the plurality of samples as display objects. Thus, the user can compare and refer to the measurement data of the same type between a plurality of samples. Further, the user can compare and refer to the feature amounts and physical property values of the same type between a plurality of samples.

Returning to FIG. 8, viewer 1 proceeds to step S26 after displaying the display data on the display screen of display unit 14 in step S25 and determines whether or not input unit 13 has received a user instruction for changing the display format. As described in the display screen example of FIG. 11, the display screen has icons (e.g., icons 201 to 205) for changing the display format. The user can switch the display format by clicking these icons.

When input unit 13 receives the user instruction for changing the display format (YES in S26), viewer 1 returns to the process of step S24 to change the display data in accordance with the user instruction. Viewer 1 displays the changed display data on the display screen of display unit 14 in step S26.

Viewer 1 also determines whether or not input unit 13 has received a user instruction for changing the display object in step S27. As described in the display screen example of FIG. 11, the display screen has icon 152 for selecting a display object and icon 154 for selecting a feature amount. For example, in the display screen example shown in FIG. 11, when the user clicks icon 152, display unit 14 switches from the display screen illustrated in FIG. 11 to the sample-selection operation screen illustrated in FIG. 9. The user can perform selection operation to change the sample to be displayed on the operation screen. Further, in the display screen example of FIG. 11, when the user clicks icon 154, the display screen illustrated in FIG. 11 is switched to the feature-amount selection operation screen illustrated in FIG. 10. The user can change feature amounts and physical property values to be displayed by performing selection operation for changing the template on the operation screen.

When input unit 13 has received a user instruction (clicking of icon 152 or 154) for changing the display object (YES in S28), viewer 1 returns to the process of step S20 to display the operation screen in FIG. 9 or 10 on display unit 14. Upon receipt of the user's selection, viewer 1 executes the processes of steps S22 to S24 again to select the sample, the feature amounts, and the physical property values that are display objects after the change. After generating display data in step S24, viewer 1 displays the generated display data on the display screen of display unit 14 in step S25.

As described above, according to viewer 1 of the present embodiment, a plurality of measurement results associated with one sample can be displayed. In addition, feature amounts of the sample can be displayed together with measurement results for each sample. Thus, the user can view the measurement results and the feature amounts for each sample at the same time. In addition, the feature amounts can be compared between a plurality of samples.

Furthermore, according to viewer 1 of the present embodiment, a set of types of feature amounts is registered as a template, whereby the user can freely change the feature amount used for analysis such as machine learning by changing the template to be used.

Based on these benefits, viewer 1 according to the present embodiment can improve the convenience of the user who analyzes the measurement results by a plurality of types of analyzers 4. As a result, it is possible to facilitate the cross-sectional analysis of the measurement results by the plurality of types of analyzers 4, and therefore, it is possible to contribute to achievement of efficient and highly accurate analysis.

[Aspects]

It will be understood by those skilled in the art that the plurality of exemplary embodiments described above are illustrative of the following aspects.

(Item 1) An integrated viewer for multiple measurements according to one aspect includes: a storage unit that stores, for each of a plurality of types of analyzers, a type of a feature amount obtained from a measurement result of the analyzer; a display control unit that displays types of feature amounts stored in the storage unit on a display screen in a selectable manner; and a registration unit that names and registers a set of types of feature amounts selected by an operator among the types of the feature amounts. The display control unit displays, side by side on the display screen, a first display region in which the type of the feature amount is displayed in a tab for each type of the analyzers and a second display region in which the set of types of the feature amounts selected by the operator is displayed.

According to the integrated viewer for multiple measurements described in Item 1, the first display region in which the type of the feature amount is displayed in a tab for each type of the analyzers and a second display region in which the set of types of the feature amounts selected by the operator is displayed are displayed in the display screen side by side, whereby the operator can select the feature amount in the first display region while checking the content of the second display region. In addition, the tab is provided for each analyzer in first display region, by which the operator can select the feature amount by opening the tab that matches the purpose or application of the analysis. As a result, the operator can easily create a template that is a set of types of feature amounts.

(Item 2) In the integrated viewer for multiple measurements according to Item 1, an identifier for identifying a data file including a measurement result of the analyzer is displayed in each tab of the first display region. The display control unit displays, for each tab in the first display region, a type of a feature amount that is obtainable from a data file including the identifier in a file name.

With this configuration, one tab is set on the basis of the type of the analyzer and the identifier of the data file, whereby types of feature amounts obtained from the measurement result of one type of analyzer can be subdivided and displayed in the tab. Accordingly, the operator can more easily select the type of the feature amount, and thus, it is possible to facilitate the creation of template.

(Item 3) In the integrated viewer for multiple measurements according to Item 1 or Item 2, the display control unit displays names of types of the feature amounts selected by the operator in the second display region in a form of a list.

With this configuration, the operator can easily confirm the selected type of the feature amount from the list displayed in the second display region, and thus, can smoothly select the type of the feature amount.

(Item 4) In the integrated viewer for multiple measurements according to Item 3, the display control unit further displays, in the second display region, an icon for setting display and non-display on the display screen for each of the types of the feature amounts displayed in the list.

With this configuration, the feature amount that is used to calculate an arithmetic value but does not need to be used in machine learning and does not need to be displayed from among the selected types of feature amounts can be set to be hidden by the operator.

(Item 5) In the integrated viewer for multiple measurements according to Item 3, the display control unit enables grouping of a plurality of types of the feature amounts displayed in the second display region.

With this configuration, the plurality of feature amounts can be classified according to the purpose or application of the analysis, whereby the efficiency of analysis work can be improved.

(Item 6) In the integrated viewer for multiple measurements according to Item 3, the display control unit is capable of changing an arrangement order of a plurality of types of the feature amounts displayed in the second display region.

With this configuration, the user can display the plurality of feature amounts in the priority order according to the purpose or application of the analysis.

(Item 7) In the integrated viewer for multiple measurements according to any one of Items 1 to 6, the display control unit further displays, in the first display region, a tab for setting a physical property value type of a sample obtained from information other than the measurement result.

With this configuration, the physical property value of the desired sample can be included in the template as the type of the feature amount, whereby the physical property value can be displayed and used for machine learning.

(Item 8) In the integrated viewer for multiple measurements according to any one of Items 1 to 7, the display control unit further displays, in the first display region, a tab for setting an arithmetic value calculated using one or a plurality of feature amounts.

With this configuration, a desired arithmetic value can be included in the template as the type of the feature amount, whereby the arithmetic value can be displayed and used for machine learning.

(Item 9) In the integrated viewer for multiple measurements according to any one of Items 1 to 8, the plurality of types of analyzers include at least one of a liquid chromatograph, a gas chromatograph, a liquid chromatograph mass spectrometer, and a gas chromatograph mass spectrometer. The type of the feature amount stored in the storage unit includes at least one of a retention time and a peak area of a chromatogram.

(Item 10) A program according to one aspect causes a computer to operate as the integrated viewer for multiple measurements according to any one of Items 1 to 9.

With this configuration, the computer can provide a user interface that facilitates a cross-sectional analysis of measurement results by a plurality of types of analyzers.

It should be noted that with respect to the above-described embodiments and modifications, it is planned from the time of filing the application that the configurations described in the embodiments are appropriately combined, including combinations not described in the specification, as long as there is no disadvantage or inconsistency.

The embodiments and modifications disclosed herein are to be considered in all respects as illustrative and not restrictive. The scope of the present invention is indicated by the appended claims rather than by the foregoing descriptions, and is intended to include all modifications within the meanings and ranges equivalent to the claims.

What is claimed is:

1. An integrated viewer for multiple measurements comprising:

a storage unit that stores, for each of a plurality of types of analyzers, a type of a feature amount, wherein the feature amount is obtained from a measurement result of the analyzer and used for machine learning;

a display control unit that displays types of feature amounts stored in the storage unit on a display screen in a selectable manner; and a registration unit that names and registers a set of types of feature amounts selected by an operator among the types of the feature amounts, wherein the display control unit displays, side by side on the display screen, a first display region and a second display region, the display control unit is configured to:

display a tab creation screen in the first display region, wherein the tab creation screen provides a plurality of tabs;

in response to one of the plurality of tabs being selected, display the selected tab in the first display region, and display, in the selected tab, the types of the feature amounts that are acquired from a data file specified based on the analyzer, an identifier, and output item; and in response to the set of types of the feature amounts being selected in the first display region, simultaneously display the set of types of the feature amounts in the second display region in a form of a list, wherein the list of the set of types of the feature amounts created in the second display region is registered as a template.

2. The integrated viewer for multiple measurements according to claim 1, wherein the identifier for identifying the data file including a measurement result of the analyzer is displayed in each of the tabs of the first display region, and the display control unit displays, for each of the tabs in the first display region, a type of a feature amount that is obtainable from the data file including the identifier in a file name.

3. The integrated viewer for multiple measurements according to claim 1, wherein the display control unit displays names of types of the feature amounts selected by the operator in the second display region in a form of a list.

4. The integrated viewer for multiple measurements according to claim 3, wherein the display control unit further displays, in the second display region, an icon for setting display and non-display on the display screen for each of the types of the feature amounts displayed in the list.

5. The integrated viewer for multiple measurements according to claim 3, wherein the display control unit enables grouping of a plurality of types of the feature amounts displayed in the second display region.

6. The integrated viewer for multiple measurements according to claim 3, wherein the display control unit is capable of changing an arrangement order of a plurality of types of the feature amounts displayed in the second display region.

7. The integrated viewer for multiple measurements according to claim 1, wherein the display control unit further displays, in the first display region, a tab for setting a physical property value type of a sample obtained from information other than the measurement result.

8. The integrated viewer for multiple measurements according to claim 1, wherein the display control unit further displays, in the first display region, a tab for setting an arithmetic value calculated using one or a plurality of feature amounts.

9. The integrated viewer for multiple measurements according to claim 1, wherein the plurality of types of analyzers include at least one of a liquid chromatograph, a gas chromatograph, a liquid chromatograph mass spectrometer, and a gas chromatograph mass spectrometer, and the type of the feature amount stored in the storage unit includes at least one of a retention time and a peak area of a chromatogram.

10. A non-transitory computer-readable media, storing a program causing a computer to operate as the integrated viewer for multiple measurements according to claim 1.

* * * * *